United States Patent [19]
Matsumiya

[11] 3,844,227
[45] Oct. 29, 1974

[54] AXLE SPRING SNUBBING DEVICE FOR RAILWAY CARS

[75] Inventor: Soichi Matsumiya, Osaka, Japan

[73] Assignee: Sumitomo Metal Industries Limited, Osaka, Japan

[22] Filed: Dec. 19, 1973

[21] Appl. No.: 425,950

[52] U.S. Cl. .......................................... 105/224 R
[51] Int. Cl. ............................................... B61f 5/26
[58] Field of Search..... 105/218, 222, 224 R, 224 A

[56] References Cited
UNITED STATES PATENTS

| | | | |
|---|---|---|---|
| 2,552,144 | 5/1951 | Barrows | 105/224 R |
| 2,566,158 | 8/1951 | Barrows et al. | 105/224 R |
| 2,720,848 | 10/1955 | Couch | 105/224 R |

FOREIGN PATENTS OR APPLICATIONS

| | | | |
|---|---|---|---|
| 191,552 | 1/1923 | Great Britain | 105/224 R |

Primary Examiner—Lloyd L. King
Assistant Examiner—John J. Love

[57] ABSTRACT

An axle spring snubbing device for railway cars wherein a bore is made in each wing part of an axle box, a cup-shaped spring seat is slidably inserted in this bore and a compression spring is interposed between a lid fitted to cover the above mentioned bore and the spring seat so that the above mentioned spring seat may be pressed against a side wall of a truck frame by the compression spring.

A proper damping effect will be given to the up-and-down motion of the axle spring by the frictional engagement of the side wall and spring seat with each other.

5 Claims, 3 Drawing Figures

PATENTED OCT 29 1974　　　　　　　　　　3,844,227

AXLE SPRING SNUBBING DEVICE FOR RAILWAY CARS

This invention relates to axle spring snubbing devices for railway cars.

It has been suggested to improve vertical vibration characteristics by using a coil spring for the bolster spring and using also an oil damper for the snubbing device in the conventional technique. However, in such kind of axle spring snubbing device, not only an oil feed is periodically required but also the maintenance and inspection have been very troublesome.

An object of the present invention is to provide an axle spring snubbing device for railway cars wherein the maintenance and inspection are easy and any damping effect is obtained by selecting the spring.

In the axle spring snubbing device according to the present invention, a bore is made in each wing part of an axle box, a spring seat cup is inserted in the above mentioned bore, a friction shoe to contact a side wall of a truck frame is fitted to the outside surface of the above mentioned spring seat cup, a lid is fitted to a fitting seat fitted to the outside surface of the above mentioned wing part and a compression spring is interposed between the above mentioned spring seat cup and lid.

Figure 1:
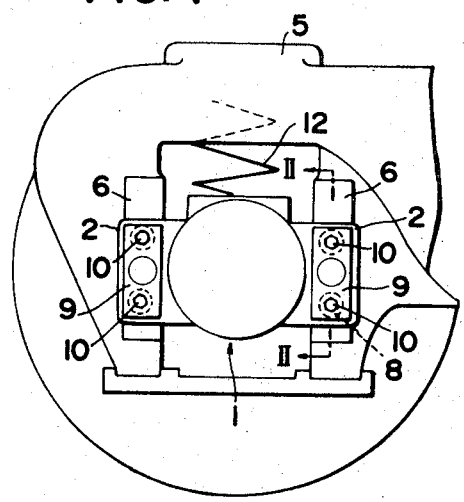
FIG. 1 is a side view of an embodiment of the axle spring snubbing device for railway cars according to the present invention.
Figure 2:
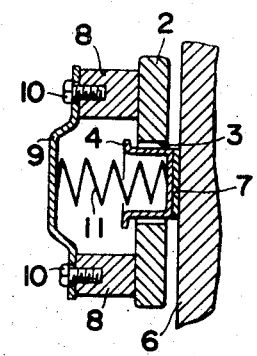
FIG. 2 is a vertically sectioned partial view on line II—II in FIG. 1.

In the first embodiment shown in FIGS. 1 and 2, 1 is an axle box pivotally supporting an axle, a bore 3 is made in each of wing parts 2 extending in the diametral direction of this axle box, a cup-shaped spring seat 4 is slidably inserted in the bore 3, a friction shoe 7 to contact a side wall 6 of a truck frame 5 is fitted to an outward bottom surface of the cup of the spring seat 4, a lid 9 having a recess substantially in the central part is fitted with bolts 10 to fitting seats 8 secured near both ends in the vertical direction of the wing part 2 and such compression spring 11 as a coil spring is interposed between the cup-shaped spring sea 4 and the lid 9 so that the compression spring 11 may always press the spring seat 4 against the side wall side while being supported by the cup of the spring seat 4 and the lid 9. By the way, 12 is an axle spring.

Figure 3:
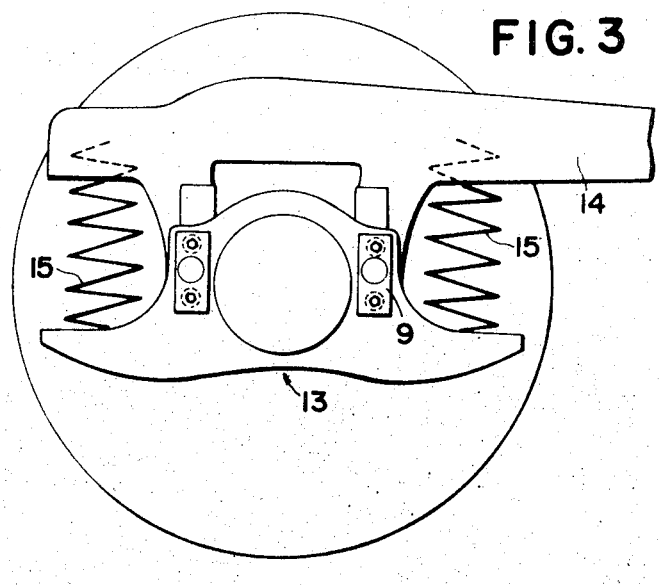
FIG. 3 is a side view of another embodiment of the axle spring snubbing device according to the present invention.

In the second embodiment shown in FIG. 3, 13 is a wing type axle box, 14 is a truck frame, 15 is an axle spring and the other structural parts are the same as in the first embodiment.

In the present invention, as the structure is as mentioned above, the friction shoe 7 fitted to the outward bottom surface of the spring seat 4 is always frictionally pressed against the side wall of the truck frame 5 or 14 by the compression spring 11 and therefore, in case the truck frame sinks for any reason or, in other words, even in case the axle spring 12 or 15 is compressed, a proper damping effect will be given to the up-and-down motion of the axle spring by the frictional engagement of the friction shoe with the side wall.

As in the above, in the present invention, not only no such oil damper as in the conventional technique is required and no maintenance is substantially required but also the inspection is easy and any damping effect is obtained by selecting the compression spring.

What is claimed is:

1. An axle spring snubbing device for railway cars comprising a bore means provided in each of wing parts of an axle box, a cup-shaped spring seat slidably inserted in the bore means, fitting seat secured as vertically spaced to each of the above mentioned wing parts, a lid fitted with fixing means to each fitting seat and a spring means interposed between the lid and spring seat.

2. An axle spring snubbing device for railway cars according to claim 1 wherein a friction shoe is secured to the outward bottom surface of the cup of each of said cup-shaped spring seats.

3. An axle spring snubbing device for railway cars according to claim 1 wherein said fixing means are bolts.

4. An axle spring snubbing device for railway cars according to claim 1 wherein a recess to properly seat the end part of said spring means is made in the central part of said lid.

5. An axle spring snubbing device for railway cars according to claim 1 wherein said spring means is a coil spring.

* * * * *